(12) United States Patent
Walrant

(10) Patent No.: US 10,581,609 B2
(45) Date of Patent: Mar. 3, 2020

(54) LOG MESSAGE AUTHENTICATION WITH REPLAY PROTECTION

(71) Applicant: NXP B.V., Eindhoven (NL)

(72) Inventor: Thierry G. C. Walrant, Bouge (BE)

(73) Assignee: NXP B.V., Eindhoven (NL)

( * ) Notice: Subject to any disclaimer, the term of this patent is extended or adjusted under 35 U.S.C. 154(b) by 257 days.

(21) Appl. No.: 15/790,612

(22) Filed: Oct. 23, 2017

(65) Prior Publication Data

US 2019/0123906 A1 Apr. 25, 2019

(51) Int. Cl.
*H04L 9/32* (2006.01)
*H04L 9/14* (2006.01)
*H04L 9/06* (2006.01)

(52) U.S. Cl.
CPC .......... *H04L 9/3226* (2013.01); *H04L 9/0631* (2013.01); *H04L 9/14* (2013.01); *H04L 9/3242* (2013.01)

(58) Field of Classification Search
CPC ... H04L 9/3226; H04L 9/3242; H04L 9/0631; H04L 9/14
See application file for complete search history.

(56) References Cited

U.S. PATENT DOCUMENTS

| | | | | |
|---|---|---|---|---|
| 10,218,499 B1* | 2/2019 | El Idrissi | ................. | G06F 21/73 |
| 2014/0310530 A1* | 10/2014 | Oguma | .................. | H04L 9/3242 |
| | | | | 713/181 |
| 2016/0173505 A1* | 6/2016 | Ichihara | ................ | H04L 63/123 |
| | | | | 713/170 |
| 2016/0191408 A1* | 6/2016 | Yajima | ................. | H04L 12/4641 |
| 2016/0330032 A1* | 11/2016 | Naim | ..................... | H04L 9/3242 |
| 2016/0344552 A1* | 11/2016 | Sharma | .................. | H04L 9/3242 |
| 2017/0324557 A1* | 11/2017 | Morita | ....................... | H04L 9/32 |
| 2017/0366342 A1* | 12/2017 | Gehrmann | .............. | H04W 4/70 |
| 2018/0007076 A1* | 1/2018 | Galula | .................... | G06F 21/85 |

(Continued)

FOREIGN PATENT DOCUMENTS

WO    WO-2016/090249 A1    1/2016

OTHER PUBLICATIONS

Bretting, Anton, et al.; "Vehicle Control Unit Security Using Open Source AUTOSAR" Master's Thesis in Software Engineering; Department of Computer Science and Engineering, Software Engineering, University of Gothenburg, Sweden; 127 Pages; Jun. 2015.

(Continued)

*Primary Examiner* — Baotran N To
(74) *Attorney, Agent, or Firm* — Daniel D. Hill

(57) ABSTRACT

A method is provided for authenticating a log message in a distributed network having a plurality of nodes coupled to a serial bus. In the method, a log session is started by a first device at a first node of the plurality of nodes. A first counter value is provided by the first device to the serial bus. A log message is generated by a second device at a second node of the plurality of nodes. A second counter value is generated by the second device. A log message payload is generated for the log message, wherein the log message payload includes a log message authentication code. A computation of the log message authentication code includes the first counter value and the second counter value. The second device does not store the first counter value in a non-volatile memory on the second device.

19 Claims, 2 Drawing Sheets

(56) References Cited

U.S. PATENT DOCUMENTS

2018/0131522 A1* 5/2018 Lawlis .................. H04L 9/3242
2019/0123908 A1* 4/2019 Morita .................. H04L 9/3242

OTHER PUBLICATIONS

CAN (Controller Area Network) Newsletter, 46 Pages, Jun. 2017.
Corrigan, Steve; Introduction to the Controller Area Network (CAN); Texas Instruments Application Report SLOA101B; 17 Pages; Aug. 2002, Revised May 2016.
Dworkin, Morris; "Recommendation for Block Cipher Modes of Operation: The CMAC Mode for Authentication" NIST Special Publication 800-38B; doi.orgi10.6028/NIST.SP.800-38B; 21 Pages; May 2005 Including Updates as of Oct. 6, 2016: p. II.
Murvay, P-S. et al.; "Security Shortcomings and Countermeasures for the SAE J1939 Commercial Vehicle Bus Protocol;" Department of Automatics and Applied Informatics, Politehnica University of Timisoara, Romania; Grant Project No. PN-II-RU-TE-2014-4-1501 (2015-2017); 10 Pages.
Robertson, Alasdair; FTF Freescale Technology Forum; MPC5748G Gateway, HSM and Secure OTA Update, FTF-AUT-F0347; 38 Pages; Apr. 2014.

* cited by examiner

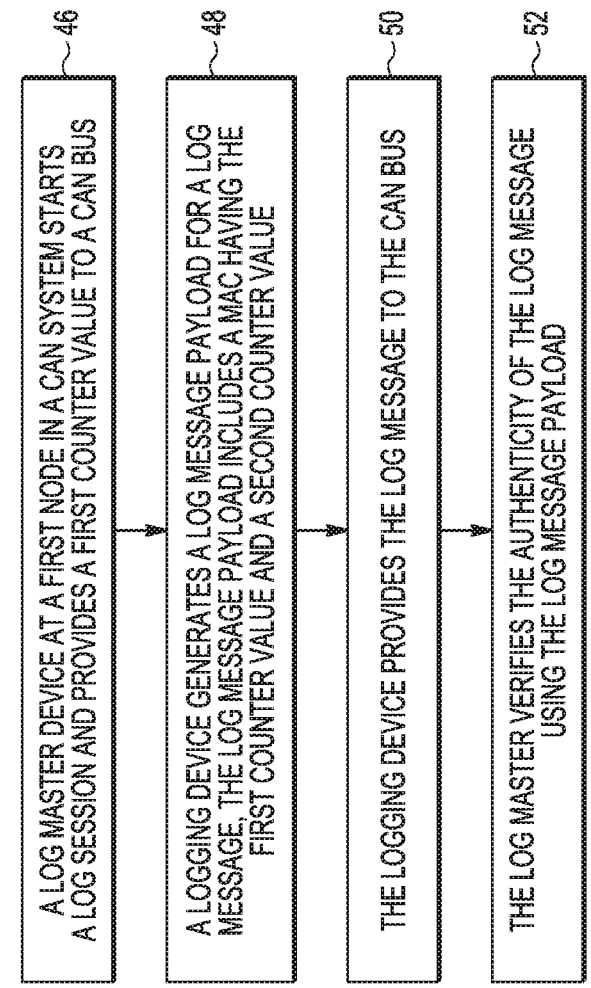

LOG MESSAGE AUTHENTICATION WITH REPLAY PROTECTION

BACKGROUND

Field

This disclosure relates generally to security, and more specifically to message authentication with replay protection.

Related Art

The controller area network (CAN) is a communication standard that is used primarily for automotive applications. CAN provides serial communication between processors, sensors and actuators in a distributed network system. When CAN was first developed, there was no need to consider security because there was no provision for external access. However, the CAN system is now remotely, or externally, accessible by, for example, on-board diagnostics (OBD) systems for configuration and reporting regarding a vehicle's electronics.

The exposure of a vehicle's systems to external entities creates security and safety risks. To mitigate the risks, devices of a CAN are required to report security violations using secure log messages. The log messages are required to be protected for integrity, authenticity and shall be non-reputable.

Log messages are limited in the number of bits that can be transmitted on a CAN bus. The classical high speed CAN standard limits a CAN message data frame payload to 8-bytes. Therefore, only a few bits are available for a replay protection counter, causing the counter to regularly wrap-around (e.g., every 256 messages for an 8-bit counter value). Every time the counter wraps around, a new log session is started. A log session is defined as a time period when a replay protection counter follows steps to uniquely identify a message. However, some logging devices with limited resources are unable to identify, manage, and distinguish successive log sessions. Moreover, the devices with limited resources, such as for example, devices without non-volatile memory, may be unable to retain the value of the replay protection counter across device power cycles. After a device reset, the value of the replay counter is not related to any used value during a previous power cycle. Therefore, there is some chance that a previously used replay protection counter may be reused.

Therefore, a need exists for a method to provide replay protection for a log message generated by a logging device with limited resources.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 illustrates a CAN data frame in accordance with an embodiment.

FIG. 3 illustrates a method for log message authentication in accordance with an embodiment.

DETAILED DESCRIPTION

Figure 1:
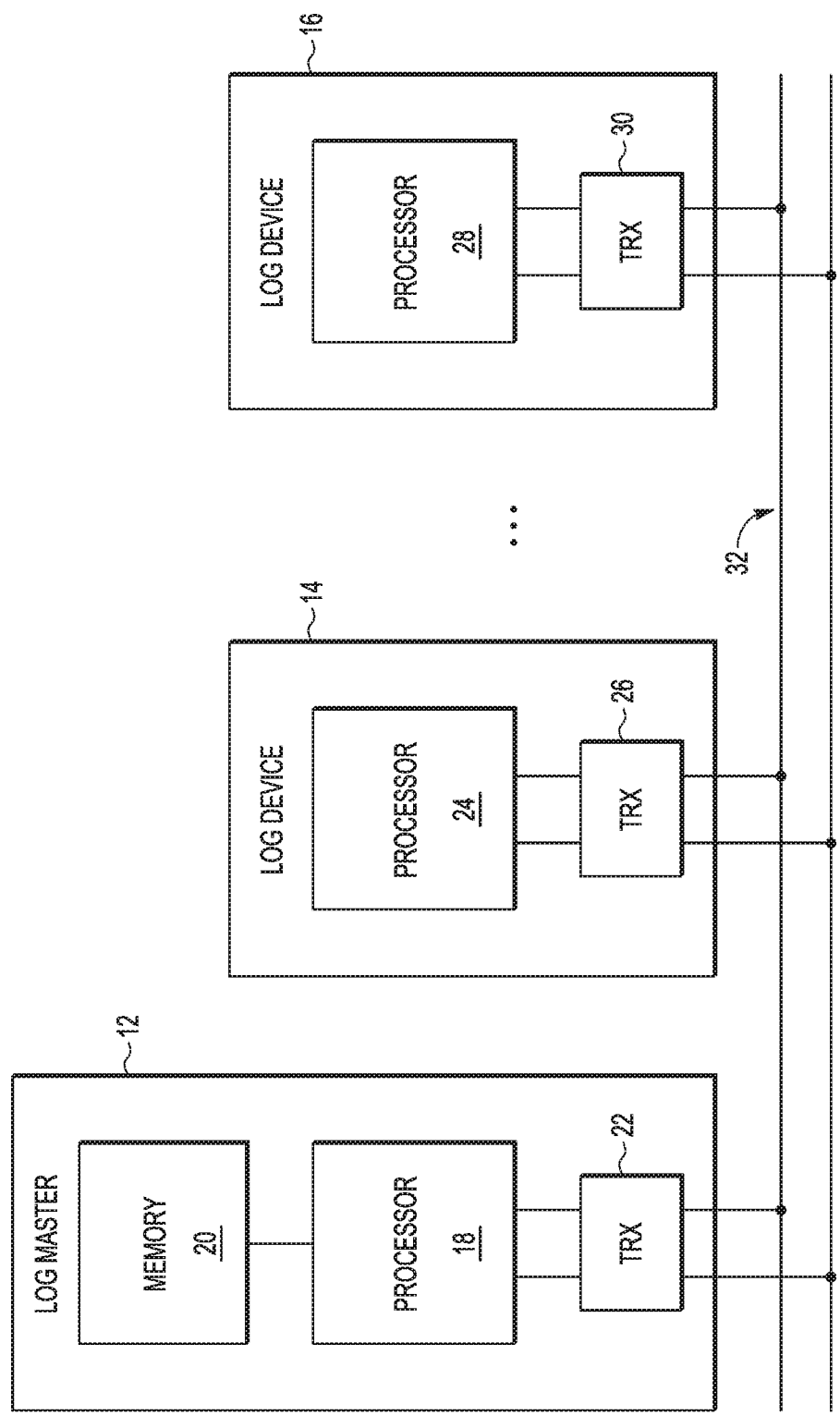
FIG. 1 illustrates a distributed network system in accordance with an embodiment.

Generally, there is provided, a method for authenticating a log message in a distributed system having a plurality of devices connected to each other via a serial bus. At least one of the devices is configured as a logging device to transmit secure log messages for reporting a system state such as a rules violation. At least one of the devices is configured to function as a log master. The log master is responsible for the management and verification of the log message authenticity. The log master manages, reports, and authenticates a log session to a log diagnostic device. The log master begins a log session by invalidating any previous session and invalidating a counter value used by the logging device. The log master generates a session counter value that is incremented for each new log session. An authentication code is added to a payload portion of each log message that is transmitted by the logging device. The authentication code includes a device generated counter value that is incremented each time a log message is transmitted. The session counter value is transmitted on the serial bus and is used to authenticate the transmitted log message. The log master authenticates the log message. The counter values, generated by the log master and the logging device, together are used to maintain a freshness of the log message based on a unique active log session. Delegating part of the responsibility for ensuring freshness of the log message generated by the logging device releases the logging device from management of replay protection and reduces the memory requirements of the logging device.

In accordance with an embodiment, there is provided, a method for authenticating a log message in a distributed network having a plurality of nodes coupled to a serial bus, the method including: starting a log session, by a first device, at a first node of the plurality of nodes; providing a first counter value, by the first device, to the serial bus; generating a log message, by a second device, at a second node of the plurality of nodes; generating a second counter value by the second device; generating a log message payload for the log message, wherein the log message payload comprises a log message authentication code, a computation of the log message authentication code comprising the first counter value and the second counter value, wherein the second device does not store the first counter value in a non-volatile memory on the second device; and providing the log message payload, by the second device, to the serial bus from the second node. The log message authentication code may include a cipher-based message authentication code using advanced encryption standard (AES) encryption. The first device at the first node may be characterized as being a log master and the second device at the second node may be characterized as being a logging device. The second counter value may include no more than 8-bits. The first and second counter values together may provide replay protection for the log message. Starting the log session may further include resetting the second counter value to zero and incrementing the first counter value. The distributed network may be characterized as being a controller area network (CAN). The log message authentication code may further include: a sender node identifier, an identifier for a type of security violation being reported by the log message, and an encryption key. Starting the log session may further include: invalidating any previous log session; invalidating any previous used first counter values and second counter values; and setting a new first counter value.

In another embodiment, there is provided, a method for authenticating a log message in a controller area network (CAN), the method including: starting a log session, by a first device, at a first node of the CAN; providing a first counter value, by the first device, to a CAN bus; generating a log message, by a second device, at a second node of the CAN bus; generating a second counter value by the second device; generating a log message payload for the log message, wherein the log message payload comprises a log message authentication code, a computation of the log message authentication code comprising the first counter value and the second counter value, wherein the second device does not store the first counter value in a non-volatile memory on the second device; and providing the log message payload, by the second device, to the CAN bus from the second node. The second device may be characterized as being a transceiver integrated circuit. The first and second counter values together may provide replay protection for the log message. The first device at the first node may be characterized as being a log master and the second device at the second node may be characterized as being a logging device. The log message payload may further include: a sender node identifier, an identifier for a type of security violation being reported by the log message, and an encryption key. Starting the log session may further include: invalidating any previous log session; invalidating any previous used first counter values and second counter values; and setting a new first counter value.

In yet another embodiment, there is provided, an integrated circuit device for a node of a distributed network having plurality of nodes coupled to a serial bus, the integrated circuit device including: a transceiver coupled to the serial bus, wherein the transceiver generates a log message payload for a log message to be transmitted on the serial bus by the transceiver, wherein the transceiver generates a first counter value, wherein the log message payload comprises the first counter value, the first counter value generated by the integrated circuit device, and wherein a second counter value is generated by a different integrated circuit device coupled to a different node of the plurality of nodes, and wherein together the first and second counter values provide replay protection for the log message. The integrated circuit device may be characterized as being a transceiver. The different integrated circuit device may be characterized as being a log master device, wherein the log master device may start a log session by invalidating any previous used first counter values, and setting a new second counter value. The log message payload may further include: a sender node identifier, an identifier for a type of security violation being reported by the log message, and an encryption key. The distributed network may be characterized as being a controller area network (CAN).

FIG. 1 illustrates a distributed network system 10 in accordance with an embodiment. In one embodiment, distributed network system 10 is a CAN system. The CAN was originally developed for use in automobiles. However, CAN systems are also used in other technology areas, such as industrial automation, medical equipment, aerospace, and railway systems. System 10 includes a plurality of devices, represented by devices 12, 14, and 16 connected to corresponding ones of a plurality of nodes of CAN bus 32. CAN bus 32 is characterized as being a serial bus and has only two conductors for broadcasting a differential signal to the plurality of nodes. Each node is allowed to broadcast messages, in the form of frames, one bit at a time on CAN bus 32. Only one node can transmit at a time so an arbitration scheme known as non-destructive bitwise arbitration is used. In the case of a transmission conflict, the message with the lowest valued message identifier wins and is transmitted serially on CAN bus 32. Several different types of frames can be transmitted on a CAN bus. The data frame is the most common type. The organization of a CAN data frame is illustrated in FIG. 2 and discussed below.

Various types of devices can be connected to the nodes of a CAN bus. Device 12 is just one type of device and includes a processor 18, log memory 20, and transceiver 22. Processor 18, log memory 20 and transceiver 22 may be implemented together on one integrated circuit or as multiple integrated circuits. Processor 18, if present, may be implemented as a microprocessor (MPU), microcontroller (MCU), digital signal processor (DSP), or the like. In one embodiment, processor 18 functions as a microcontroller having CAN controller functionality for controlling the CAN functions of device 12. Memory 20 is connected to processor 18 and may be implemented as one or more non-volatile memories for storing, for example, control information and log messages. In one embodiment, transceiver 22 is a CAN transceiver connected to processor 18 and to CAN bus 32. The CAN controller integrated into processor 18 broadcasts and receives messages serially from CAN bus 32.

Devices 14 and 16 are secure logging devices in accordance with an embodiment. Device 12 is a log master. Device 14 includes processor 24 and transceiver 26. Device 16 includes processor 28 and transceiver 30. Processors 24 and 28 may be any kind of processing device such as an MPU, MCU, or DSP. The processors may include CAN controller functionality. From a security standpoint, processors 24 and 28 are untrusted. Because of this, transceivers 26 and 30 perform some security functions, such as message filtering, and are required to report status information. Transceivers 26 and 30 are characterized as being "small footprint" devices meaning that, by design, transceivers 26 and 30 lack extra resources in order to reduce costs. For example, transceivers 26 and 30 may include only a small amount of non-volatile memory (NVM), or may have an NVM limited to a very small number of programming cycles, thus limiting the ability of the transceivers to track counter values over power cycles, where there will likely be a large number of power cycles over the device lifetime. In accordance with one embodiment, one or more of logging devices 14 and 16 are provided for reporting status information regarding security and safety related events such as rules violations. The reported status is in the form of a secure log message transmitted on CAN bus 32 by one of the transceivers 26 and 30. The secure log messages are protected for integrity, authenticity, and are non-reputable.

Replay protection protects a device from an attack that attempts to reuse an old authentication code. To provide the replay protection, typically, a log message may include a counter value that is not repeated, such as from a monotonic counter. However, logging transceivers 26 and 30 lack resources to provide adequate replay protection. Also, the length of a CAN message payload is limited to 8 bytes for a classical CAN, limiting the size of a counter value that can be included. The message payload includes all parts of the authenticated log message which leaves only a few bits for the counter used for replay protection. In one embodiment, the counter value provided by the logging device can only include 8 bits. An 8-bit counter would regularly wrap around, for example, every 256 messages. Also, the 8-bit counter would have to be reset at each power-on reset. A log session would have to be initiated at power-on and each time the 8-bit counter wrapped around.

In accordance with the illustrated embodiment, transceivers 26 and 30 of logging devices 14 and 16 manage the authenticity within a log session. Log master device 12 renews the log sessions and logs the log sessions for reporting to, for example, a diagnostic or analyzer device. Log master device 12 must be able to verify and trust the log whenever the log entries from one of the logging devices uses repeated counter values. The log, as recorded by log master 12, may include log device entries, log session initiation events, and log master events. To correctly identify and distinguish two or more log messages, transceivers 26 and 30 rely on log master device 12 to manage the "freshness" of a log session. Log master device 12 provides an additional counter value ($R_{LOG}$) that is included in the generation of the log message authentication code. The additional counter value $R_{LOG}$ is incremented for each new log session. The counter value provided by the logging device is labeled $Cntr_{LOG}$. Together, the counter value $CntrLo_G$ and counter value $R_{LOG}$ maintain the freshness of the log message created by the logging device. To perform authentication, a message authentication code ($MAC_{LOG}$) is computed where $$MAC_{LOG} = CMAC_{AES}(K_{LOG}, Tx\text{-}CANID \| R_{LOG} \| ResponseCode \| SndrID \| Cntr_{LOG} \| LogData)$$

In the illustrated embodiment, the message authentication code $MAC_{LOG}$ is generated over a concatenation of multiple bit strings as indicated by the ∥ symbol above. In another embodiment, the computation of the code $MAC_{LOG}$ may be different. In the above authentication code, $CMAC_{AES}$ is a cipher-based message authentication code based on advanced encryption standard (AES) encryption. In other embodiments, a different encryption/decryption technique may be used. Bit field $K_{LOG}$ is a shared key that is not diversified per device and may be 128 bits long. In another embodiment, diversified keys may be used. Bit field TxCANID is the message identifier. The bit field ResponseCode identifies what the response to the message will be. The bit field SndrID includes the name of the log device node. The bit field $Cntr_{LOG}$ is the counter value provided by the logging device such as transceivers 26 and 30. The bit field LogData is the information being reported by the log message, such as type of violation. When the logging device transmits a log message, the data frame for the log message includes a payload portion as shown below in the example data frame of FIG. 2. In one embodiment, the 8 byte data frame payload is that the logging device broadcasts in a log message is $$Payload = ResponseCode \| SndrID \| Cntr_{LOG} \| LogData \| Truncated (MAC_{LOG})$$

where the Truncated($MAC_{LOG}$) depends on the counter value $R_{LOG}$ provided by the log master device 12. The data frame including the above payload is provided to CAN bus 32 by a logging device. The log master authenticates the log message in accordance with the current log session and the authentication code $MAC_{LOG}$.

FIG. 2 illustrates CAN bus data frame 40 in accordance with an embodiment. The CAN protocol is well known, hence there will not be a detailed discussion of the CAN protocol so as not to obfuscate the description of the illustrated embodiment. The bit fields are from the standard Controller Area Network (CAN) protocol and will be briefly described from left to right in data frame 40. The SOF (start-of-frame) bit is the single dominant start of frame bit that marks the start of a message and is used for synchronization of the CAN nodes on the CAN bus after being idle. The 11-Bit ID (identifier) is the standard CAN 11-bit ID that establishes the priority of the message. A 29-bit extended CAN ID is also supported. The lower the binary value, the higher the message priority. A single remote transmission request (RTR) bit is dominant when information is required from another node. All nodes receive the request, but the identifier determines the specified node. The responding data is also received by all nodes and used by any node that is interested. A dominant single identifier extension (IDE) bit means that a standard CAN identifier with no extension is being transmitted. Reserved bit (r0) is reserved for use in accordance with any future CAN standard amendment. The 4-bit data length code (DLC) contains the number of bytes of data being transmitted. Up to 64 bits (8 bytes) of application data may be contained in one CAN message. A 16-bit (15 bits plus a delimiter bit) cyclic redundancy check (CRC) contains the checksum (number of bits transmitted) of the preceding application data for error detection.

In accordance with the described embodiment, the payload is $$Payload = ResponseCode \| SndrID \| Cntr_{LOG} \| LogData \| Truncated (MAC_{LOG})$$

as also set out above in the discussion of FIG. 1 and includes 8 bytes for the classical CAN. In other embodiments the payload may differ by the number of bit fields, the content of the bit fields, and the number of bits allocated to each bit field. Also, the payload may be computed differently than by concatenation.

Every node receiving an accurate message overwrites the recessive ACK (acknowledge) bit in the original message with a dominant bit, indicating an error free message has been sent. Should a receiving node detect an error and leave the acknowledge bit recessive, the receiving node discards the message and the sending node repeats the message after re-arbitration. In this way, each node acknowledges the integrity of its data. The ACK is 2 bits, one bit is the acknowledgement bit and the second bit is a delimiter bit.

The end-of-frame (EOF) is a 7-bit field that marks the end of a CAN frame or message and disables bit-stuffing, indicating a stuffing error when dominant. When 5 bits of the same logic level occur in succession during normal operation, a bit of the opposite logic level is stuffed into the data. A 7-bit interframe space (IFS) contains the time required by a controller to move a correctly received frame to its proper position in a message buffer area.

The message format for Extended CAN is similar to Standard CAN, with a few differences. Substitute Remote Request (SRR) bit replaces the RTR bit. A recessive bit in the identifier extension (IDE) indicates that more identifier bits follow. The 18-bit extension follows IDE. Following the RTR and r0 bits, an additional reserve bit has been included ahead of the DLC bit.

The embodiments described herein are applicable to both Standard and Extended CAN message formats. Bus access in CAN is event driven and takes place randomly. If two nodes try to occupy CAN bus 32 simultaneously, access is implemented with a non-destructive, bit-wise arbitration. In this context, 'non-destructive' encompasses a scenario whereby the node winning arbitration just continues on with the message, without the message being destroyed or corrupted by another node. In some examples, the allocation of priority to messages may be contained in the identifier.

FIG. 3 illustrates method 44 for log message authentication in accordance with an embodiment. At step 46, a log master device at a first node, such as log master device 12 in FIG. 1, starts a log session and broadcasts a first counter value ($R_{LOG}$) to CAN bus 32. At step 48, a logging device at a second node, such as one of logging devices 14 and 16, generates a log message payload for a log message during the log session. The log message may be generated to report a detected rules violation. The log message payload includes a second counter value generated by the logging device. (Note that the first counter value $R_{LOG}$ is not included in the payload because it is known by both the logging device and the log master.) Both the first and second counter values are used to generate the MAC. In the illustrated embodiment, the first counter value was broadcast by the log master to start the log session, and the second counter value $Cntr_{LOG}$ is generated by the logging device when the log message is generated. The counter value $R_{LOG}$ is not stored in a non-volatile memory of the logging device. Together, the two counter values provide replay protection to the log message as discussed above. At step 50, the logging device broadcasts the log message to the CAN bus. At step 52, the log master verifies the authenticity of the log message using the received log message payload.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for authenticating a log message in a distributed network having a plurality of nodes coupled to a serial bus, the method comprising:
   starting a log session, by a first device, at a first node of the plurality of nodes;
   providing a first counter value, by the first device, to the serial bus;
   generating a log message, by a second device, at a second node of the plurality of nodes;
   generating a second counter value by the second device;
   generating a log message payload for the log message, wherein the log message payload comprises a log message authentication code, a computation of the log message authentication code comprising the first counter value and the second counter value, wherein the second device does not store the first counter value in a non-volatile memory on the second device; and
   providing the log message payload, by the second device, to the serial bus from the second node.

2. The method of claim 1, wherein the log message authentication code comprises a cipher-based message authentication code using advanced encryption standard (AES) encryption.

3. The method of claim 1, wherein the first device is characterized as being a log master and the second device is characterized as being a logging device.

4. The method of claim 1, wherein the second counter value comprises no more than 8-bits.

5. The method of claim 1, wherein the first and second counter values together provide replay protection for the log message.

6. The method of claim 1, wherein starting the log session further comprises resetting the second counter value to zero and incrementing the first counter value.

7. The method of claim 1, wherein the distributed network is characterized as being a controller area network (CAN).

8. The method of claim 1, wherein the log message authentication code further comprises: a sender node identifier, an identifier for a type of security violation being reported by the log message, and an encryption key.

9. The method of claim 1, wherein starting the log session further comprises:
   invalidating any previous log session;
   invalidating any previous used first counter values and second counter values; and
   setting a new first counter value.

10. A method for authenticating a log message in a controller area network (CAN), the method comprising:
    starting a log session, by a first device, at a first node of the CAN;
    providing a first counter value, by the first device, to a CAN bus;
    generating a log message, by a second device, at a second node of the CAN bus;
    generating a second counter value by the second device;
    generating a log message payload for the log message, wherein the log message payload comprises a log message authentication code, a computation of the log message authentication code comprising the first counter value and the second counter value, wherein the second device does not store the first counter value in a non-volatile memory on the second device; and
    providing the log message payload, by the second device, to the CAN bus from the second node.

11. The method of claim 10, wherein the second device is characterized as being a transceiver integrated circuit.

12. The method of claim 10, wherein the first and second counter values together provide replay protection for the log message.

13. The method of claim 10, wherein the first processor at the first device is characterized as being a log master and the second device at the second node is characterized as being a logging device.

14. The method of claim 10, wherein the log message payload further comprises: a sender node identifier, an identifier for a type of security violation being reported by the log message, and an encryption key.

15. The method of claim 10, wherein starting the log session further comprises:
 invalidating any previous log session;
 invalidating any previous used first counter values and second counter values; and
 setting a new first counter value.

16. An integrated circuit device for a node of a distributed network having a plurality of nodes coupled to a serial bus, the integrated circuit device comprising:
 a transceiver coupled to the serial bus, wherein the transceiver generates a log message payload for a log message to be transmitted on the serial bus by the transceiver, wherein the transceiver generates a first counter value, wherein the log message payload comprises the first counter value, the first counter value generated by the integrated circuit device, and wherein a second counter value is generated by a different integrated circuit device coupled to a different node of the plurality of nodes, wherein the different integrated circuit device is characterized as being a log master device, the log master device starting a log session by invalidating any previously used first counter values and setting a new second counter value, and wherein together the first and second counter values provide replay protection for the log message.

17. The integrated circuit device of claim 16, wherein the first counter value and the second counter value are used to generate a log message authentication code.

18. The integrated circuit device of claim 16, wherein the log message payload further comprises: a sender node identifier, an identifier for a type of security violation being reported by the log message, and an encryption key.

19. The integrated circuit device of claim 16, wherein the distributed network is characterized as being a controller area network (CAN).

* * * * *